(12) United States Patent
Tiwari et al.

(10) Patent No.: US 8,828,513 B2
(45) Date of Patent: Sep. 9, 2014

(54) ENERGY ABSORBING STITCH RIPPING COMPOSITE TUBES CONTAINING COLLAPSIBLE CELLS

(75) Inventors: Chandrashekhar Tiwari, State College, PA (US); Edward C. Smith, Lemont, PA (US); Charles E. Bakis, State College, PA (US); Michael A. Yukish, State College, PA (US); William Kong, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 1062 days.

(21) Appl. No.: 12/538,978

(22) Filed: Aug. 11, 2009

(65) Prior Publication Data

US 2010/0040815 A1 Feb. 18, 2010

Related U.S. Application Data

(60) Provisional application No. 61/110,122, filed on Oct. 31, 2008, provisional application No. 61/088,458, filed on Aug. 13, 2008.

(51) Int. Cl.
| | |
|---|---|
| B32B 1/08 | (2006.01) |
| B32B 5/28 | (2006.01) |
| B32B 7/08 | (2006.01) |
| B32B 5/12 | (2006.01) |
| F16F 7/00 | (2006.01) |
| B32B 5/18 | (2006.01) |
| B32B 5/26 | (2006.01) |
| B32B 5/32 | (2006.01) |

(52) U.S. Cl.
CPC ... *B32B 1/08* (2013.01); *B32B 5/28* (2013.01); *B32B 7/08* (2013.01); *B32B 5/12* (2013.01); *F16F 7/006* (2013.01); *B32B 5/18* (2013.01); *B32B 5/26* (2013.01); *B32B 5/32* (2013.01)

USPC ....... 428/36.1; 428/36.2; 428/36.3; 428/36.9; 428/113; 428/223

(58) Field of Classification Search
CPC .............. B32B 1/08; B32B 5/12; B32B 5/26; B32B 7/08; F16F 7/006; F16F 7/124; F16F 1/366; B60R 19/34
USPC .............. 428/36.1, 36.2, 36.3, 36.9, 113, 223
See application file for complete search history.

(56) References Cited

U.S. PATENT DOCUMENTS

| | | | |
|---|---|---|---|
| 5,035,307 A | 7/1991 | Sadeghi et al. | |
| 5,914,163 A | 6/1999 | Browne | |

(Continued)

FOREIGN PATENT DOCUMENTS

| | | | |
|---|---|---|---|
| DE | 19541440 A1 | * | 6/1996 |
| EP | 0 055 364 | | 7/1982 |

(Continued)

OTHER PUBLICATIONS

Rehfield et al., Nonclassical Behavior of Thin-Walled Composite Beams with Closed Cross Sections, Georgia Institute of Technology, Atlanta, Georgia.

(Continued)

*Primary Examiner* — Elizabeth Cole
(74) *Attorney, Agent, or Firm* — Buchanan Ingersoll & Rooney PC (57) ABSTRACT

An energy absorbing system has an inner tube and an outer tube that are stitched together. The inner tube contains a set of fibers oriented in a first direction and the outer tube has a second set of fibers oriented in a direction different from the first direction. Preferably these orientations are equal and opposite to each other. The inner tube may be hollow, but preferably has a cellular core. The outer tube may be spaced apart from the inner tube to create an annular cavity that is filled with a cellular material.

16 Claims, 6 Drawing Sheets

(56) References Cited

U.S. PATENT DOCUMENTS

| | | |
|---|---|---|
| 6,206,155 B1 | 3/2001 | Schneider |
| 6,601,886 B1 | 8/2003 | Thayer |
| 6,866,779 B1 | 3/2005 | Burke |
| 6,949,282 B2 | 9/2005 | Obeshaw |
| 7,238,250 B2 | 7/2007 | Kindervater |
| 2005/0147804 A1* | 7/2005 | Harada et al. .............. 428/292.1 |

FOREIGN PATENT DOCUMENTS

| | | |
|---|---|---|
| EP | 1 818 561 | 8/2007 |
| JP | 10-235763 | 9/1998 |

OTHER PUBLICATIONS

Hagon et al., A New Look at Lightweight Energy Absorbing Devices for Heavy Cargo Restraints, presented at American Helicopter Society 63rd Annual Forum, Virginia Beach, VA, May 1-3, 2007.

Harte et al., Absorption of Foam-Filled Circular Tubes with Braided Composite Walls, Eur. J. Mech. A/Solids 19 (2000) 31-50.

Mourtiz et al., A Review of the Effect of Stitching on the In-Plane Mechanical Properties of Fibre-Reinforced Polymer Composites, Composites Part A 28A (1997) 979-991.

Nampy et al., Extension-Twist Coupled Tiltrotor Blades Using Flexible Matrix Composites, 46th AIAA/ASME/ASCE/AHS/ASC Structures, Structural Dynamics & Materials Conference, Apr. 18-21, 2005, Austin, Texas.

Shan, Flexible Matrix Composites: Dynamic Characterization, Modeling, and Potential for Driveshaft Applications, Dec. 2006.

PCT Search Report for PCT/US2009/053418, Oct. 20, 2009.

* cited by examiner

ENERGY ABSORBING STITCH RIPPING COMPOSITE TUBES CONTAINING COLLAPSIBLE CELLS

CROSS-REFERENCE TO RELATED APPLICATION

The present application claims the benefit under 35 U.S.C. §119(e) of pending U.S. Provisional Patent Application Ser. No. 61/088,458, which was filed on Aug. 13, 2008 and U.S. Provisional Patent Application Ser. No. 61/110,122, which was filed on Oct. 31, 2008.

GOVERNMENT SPONSORSHIP

The U.S. Government has a paid-up license in this invention and the right in limited circumstances to require the patent owner to license others on reasonable terms as provided for by the terms of Contract Nos. N00014-06-1-0205 and N00014-08-C-0420 awarded by the Office of Naval Research.

FIELD OF INVENTION

The invention relates to restraints for holding payloads in an airplane or other transport vehicle, the restraints being able to absorb the kinetic energy of the payload that is exerted during a crash or hard landing.

BACKGROUND OF THE INVENTION

During crash or hard landings of vehicles, heavy payloads exert large g-forces on the mounts connecting them to the structural frame. As a result of those forces, payloads can break loose from these mounts and can cause serious damage to crew, passengers, payload and surrounding structure. Also heavy equipment (e.g. tool boxes, gear boxes, engines), mounted permanently inside of the vehicle, can break out of the hard mounts (Struts, tie rods etc. are some examples of hard tie downs.) and can cause similar damage.

Future heavy lift rotorcraft pose a requirement for payload capacity in excess of 60 kip (267 kN) and feature numerous heavy pieces of equipment. Simply scaling up existing restraint technology may not be the most effective approach because of the potentially high weight penalty associated with reinforcing mounting points in the vehicle structure. Therefore, restraint systems have to be improved and optimized for high effectiveness to weight ratio.

Efficient cargo restraints should be able to absorb the kinetic energy of the cargo, by allowing it to move a limited amount of distance (stroke), without transferring large loads on the mounting structure. Similarly, hard tie downs should be able to absorb kinetic energy of heavy equipment during crash sequences. These two applications differ substantially in the available distance that the cargo/equipment can move. Current payload restraint systems typically lack any load limiting capabilities. Also the hard tie downs fail to limit the load. Forces in the device continue to rise until cargo movement ceases or the device and/or attachment point fails. There is a need for energy absorbing tie downs which can limit the loads.

The most important of the issues which have to be addressed are the design constraints, such as allowable space for the cargo to move or strength of mounts etc. Generally, the space available to move parallel to the floor of the cabin is more than the space available vertically towards the ceiling. However, permanently fixed equipment, including transmission parts which are very confined in their fixture, have a requirement of very low stroke. Thus these devices have to be scaled in accordance with the design constraints.

For many applications, weight constraints associated with safety equipment are severe. Ease of mounting inside the cabin is another qualifying criterion.

Over a past few decades composites have shown considerable importance in terms of usage in structural applications. Due to their superior strength-to-weight ratio and design flexibility compared to metals, composite structures are excellent replacements for metal parts in various applications. Due to available multi dimensional parametric design space, in terms of type of fiber, type of matrix, fiber volume fractions, fiber angle and number of plies, a composite laminate can be tailored with ease for meeting wide range of design requirements. By exploiting these anisotropic properties, elastic coupling effects can easily be incorporated in the composites. One such important effect is extension-twist coupling. Rehfield et al. (1988) have provided an approach to obtain the stiffness coefficients of a composite tube in their study of thin walled closed cross section composite beams. (See: Rehfield, L. W.; Atilgan, A. R.; Hodges, D. H., "Non classical behavior of thin walled composite beams with closed cross sections" *Presented at American Helicopter Society National Technical Specialists' Meeting on Advanced Rotocraft Structures*, Oct. 25-27, 1988, Williamsburg, Va.).

Nampy and Smith (2005) have studied the extension twist coupling of flexible matrix composite box beam structures. (See: Nampy, S. N., Smith, E. C., Shan, Y., and Bakis, C. E., "Extension-Twist Coupled Tiltrotor Blades Using Flexible Matrix Composites", *Presented at the Structures and Survivability Specialists' Meeting*, Williamsburg, Va., Oct. 25-27, 2005). This coupling gives rise to twisting of composite tubes on application of axial force. Due to this, tubes can apply tangential loads on the attachments holding them circumferentially. The rate of twist can be variable depending upon the above mentioned parameters, fiber angle in particular.

Hagon et al. (2008) have shown that energy can be absorbed by the mechanism of stitch rupture. When threads in the stitches get loaded in tension, they store elastic energy. Upon stitch rupture, these threads break and dissipate the energy (see Hagon, M. J. et al. "Energy-Absorbing Textile Devices for Heavy Cargo Restraints", Presented at the American Helicopter Society $64^{th}$ Annual Forum, Montreal, Canada, Apr. 29-May 1, 2008).

The Specific Energy Absorption (SEA) of such so-called stitch ripping devices (SRDs) can be substantially higher than currently used load limiters (wire bender etc.). However, such SRDs are not particularly effective in low stroke applications, where allowable space for cargo/equipment is limited.

Many energy absorption devices rely upon crushing or buckling of the tube or other structure. Examples of such devices are disclosed in U.S. Pat. No. 5,035,307 to Sadeghi et al, U.S. Pat. No. 5,914,163 to Browne, and U.S. Pat. No. 6,949,282 to Obeshaw. U.S. Pat. No. 7,238,250 discloses an energy absorbing structure that cracks while absorbing energy. Bansemir et al. disclose an energy absorbing system in U.S. Pat. No. 6,886,779 in which a sacrificial element is disposed to be uncoupled from a transverse load path of the transverse force-absorbing guide element, and is configured to be deformed and destroyed by a relative movement between connection structures upon application of predetermined maximum load. Finally, the energy absorbing composite tube disclosed by Thayer in U.S. Pat. No. 6,601,886 has a wedge that is forced against a tubular structure causing delamination and thereby absorbing energy.

There is still need for advancement in the area of novel load limiter devices, which can have comparable or better SEA than currently used load limiters, and can be variable in terms of available stroke to length ratio.

SUMMARY OF THE INVENTION

We provide an energy absorbing system in which an inner tube and an outer tube are stitched together. The inner tube contains a set of fibers oriented in a first direction and the outer tube has a second set of fibers oriented in a direction different from the first direction. Preferably these orientations are opposite to each other. We prefer to stitch the tubes together along several seams that are parallel to the longitudinal axis of the outer tube. But, this orientation is not required.

Threads used to stitch the tubes together can be made from polyester or aramid and should have a diameter of between 0.01 mm. and 3.0 mm.

Preferably one or both of the tubes is a flexible matrix composite, a carbon epoxy composite, an aramid epoxy composite or an E-glass epoxy composite.

The inner tube may be hollow. But we prefer to provide a cellular core within the inner tube. The core should be closed cell foam. The core may be polyvinyl chloride, polyurethane, polycarbonate, styrene, ABS plastic, aluminum or alloys such as Nitanol etc.

The outer tube may be spaced apart from the inner tube to create an annular cavity that is filled with a cellular material. Preferably this cellular material is the same material used for the cellular core.

Other objects and advantages of our invention will become apparent from a description of certain present preferred embodiments thereof which are shown in the drawings.

DESCRIPTION OF THE PREFERRED EMBODIMENTS

Figure 1:
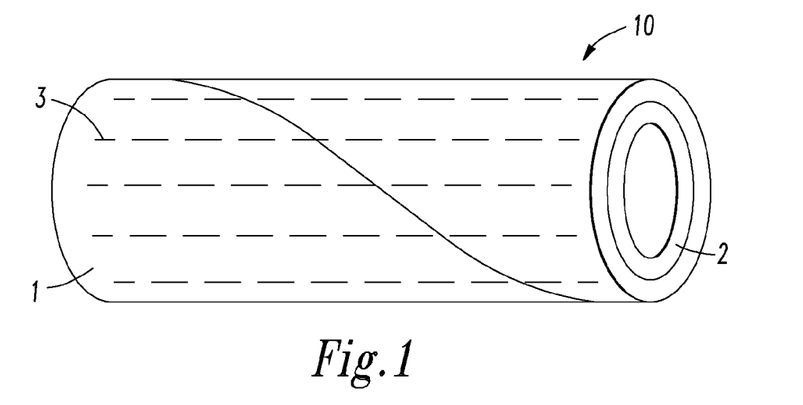
FIG. 1 is a perspective view of a first present preferred embodiment of our energy absorbing system for restraining payload in a transport vehicle.
Figure 2:
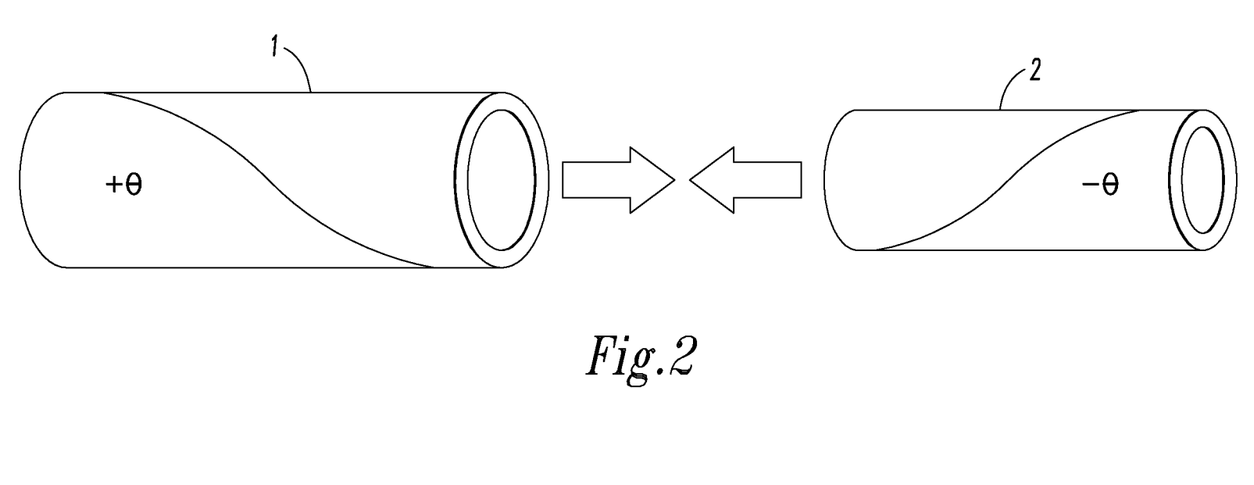
FIG. 2 is an exploded view of the embodiment shown in FIG. 1.
Figure 3:
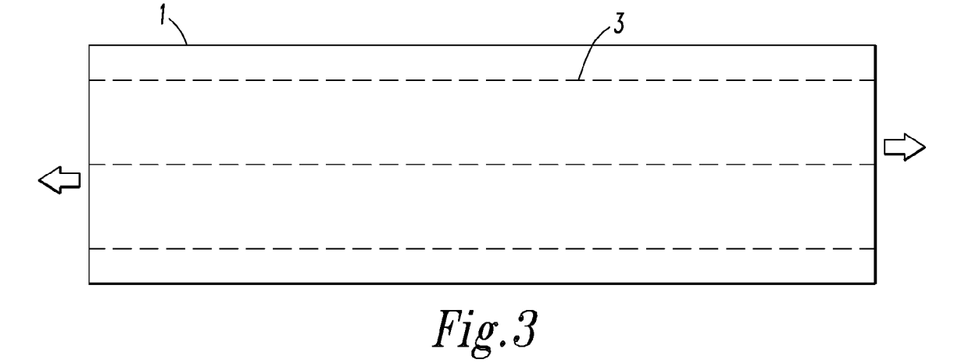
FIG. 3 is a side view of the embodiment shown in FIG. 1 showing a present preferred pattern for stitching the inner tube and the outer tube together. The tensile forces on the device are indicated by arrows.
Figure 9:
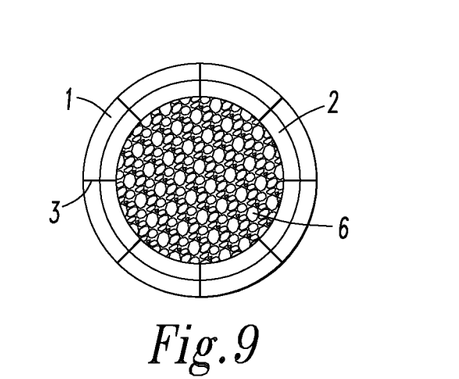
FIG. 9 is an end view of a second present preferred embodiment of our energy absorbing system for restraining cargo in a transport vehicle.

Referring to FIGS. 1 through 5 our energy absorbing and load limiting device 10 is composed of two concentric cylindrical fiber-reinforced composite tubes 1, 2 with opposite fiber angles +θ and −θ with respect to each other. These tubes are extension-twist coupled. Hence on application of axial force they have tendency to twist in opposite directions. In a third present preferred embodiment shown in FIGS. 10 and 11 we provide an annular space annular space between the tubes 1, 2 which is filled with a lightweight, tough core material 3. Therefore, the tubes form a sandwich composite with the sandwich core (foam) between them. Further these tubes 1, 2 are stitched with thread 3 across the cross section of the sandwich core and along the length. Preferably the stitches follow lines parallel to the longitudinal axis id the tubes as shown in FIG. 3. However, these seams may be positioned so as not to be parallel to that axis. We prefer to us a high strength thread such as, V-138 polyester thread, nylon or similar material. In a second present preferred embodiment shown in FIG. 9 and a third present preferred embodiment shown in FIGS. 10 and 11 the space inside the inner tube 2 is filled up with crushable foam filling 6.

Upon application of axial force, the device is under multiple resultant loads due to various couplings in the composite layers and due to presence of foam materials in the device. The modeling of the device is done in such a way that maximum energy absorption can be obtained via various energy absorbing mechanisms as listed below: The device comprises three energy absorbing mechanisms:

Shear fracture of sandwich core→Dissipates fracture energy of core.
Stitch rupture→Dissipates elastic energy stored in threads.
Crushing of the foam filling→Dissipates crush energy of foam.

When the axial force is applied to the device due to the extension twist coupling, the tubes have a tendency to twist in opposite directions due to opposite angle of fibers. The directions of twist are indicated by the arrows in FIG. 5. However, since the tubes are held together by the sandwich core foam, instead of twisting mutually with respect to each other they load the sandwich core foam in shear, and at certain applied load the foam begins to fracture in shear. This force is denoted as the limit load and the corresponding elongation as the stroke for the sandwich core fracture regime of the device. The energy is dissipated as fracture energy due to formation and propagation of cracks in the sandwich core material. Following this, in every section of the tube where the sandwich foam fracture occurs, the inner and the outer tubes have an allowance for a small mutual twist which allows for the threads to take on load in tension.

Figure 8:
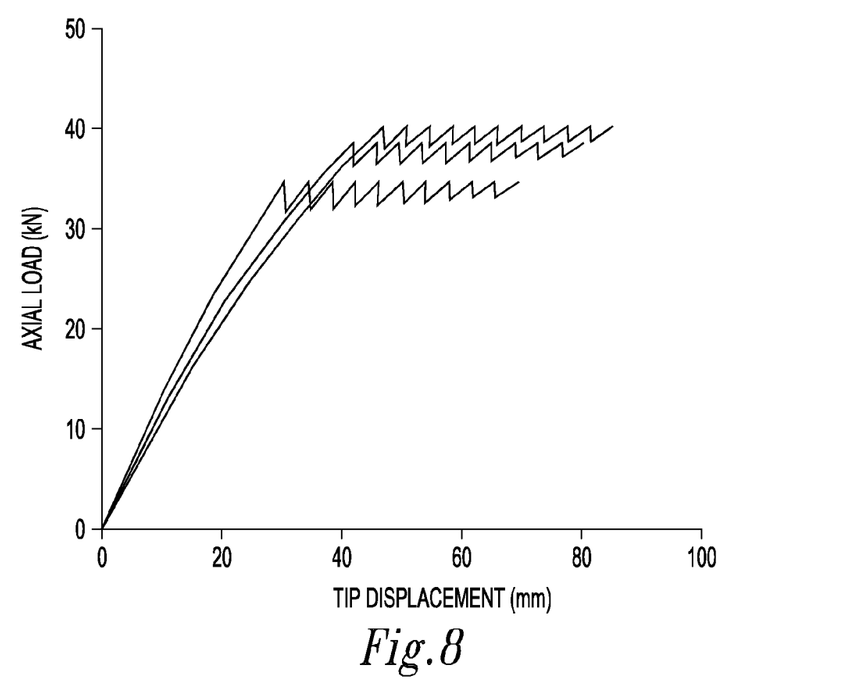
FIG. 8 is a graph showing a variation in the force vs. displacement curve of the stitch ripping regime of the device with changing crush foam modulus.

At a certain applied axial force the stitches rip and elastic energy stored in the threads is dissipated. This force is denoted the limit load for the stitch ripping regime of the device, and the corresponding elongation is denoted the stroke of the stitch ripping regime. The area under the force vs. displacement curve gives the energy absorbed by the device. The behavior of the force vs. displacement curves for the stitch ripping and the sandwich fracture phases of the device depend heavily on the material chosen for the crushable foam filling. FIG. 8 shows a variation in the force vs. displacement curve of the stitch ripping regime of the device with changing crush foam modulus.

There are several parameters that affect the energy absorption for our device. These parameters include the materials from which the tubes and the foam are made, the fiber angle the thickness and radius of the tubes. The number of stitches and the number of threads in each switch, the breaking strength and diameter of the thread, and the properties of the foam used between the tubes and the foam used in the core. The foam properties include the crush stress, elastic modulus and Poisson's ratio of the foam.

We conducted some analytical modeling of our device embodied in four systems, namely tubes made from i) a flexible matrix composite (FMC) made from a carbon/elastomeric combination, ii) carbon/epoxy, iii) aramid/epoxy and iv) E-glass/epoxy. The thread was V-138 polyester. Table 1 contains the properties of the thread used in the analysis. Table 2 reports the material properties of the tubes used in the analysis. Table 3 contains the material properties of the foam used in the analysis.

TABLE 1

Properties of thread used in analysis

| Thread Type | V-138 Polyester |
|---|---|
| Breaking strength | 985 MPa |
| Diameter | 0.36 mm |

TABLE 2

Material properties of composites used in analysis

| Parameter | FMC | Carbon/Epoxy (AS4/3501-6) | E-Glass/Epoxy | Aramid/Epoxy |
|---|---|---|---|---|
| Longitudinal modulus, $E_1$ (GPa) | 115 | 147 | 41 | 80 |
| Transverse modulus, $E_2$ (GPa) | 0.275 | 10.3 | 10.4 | 5.5 |
| Shear modulus, $G_{12}$ (GPa) | 0.250 | 7.0 | 4.3 | 2.2 |
| Poisson's ratio, $v_{12}$ | 0.314 | 0.27 | 0.28 | 0.34 |
| Longitudinal tensile strength, $F_{1t}$ (MPa) | 1955 | 2280 | 1140 | 1400 |
| Longitudinal comp. strength, $F_{1c}$ (MPa) | 110 | 1725 | 620 | 335 |
| Transverse tensile strength, $F_{2t}$ (MPa) | 15 | 57 | 39 | 30 |
| Transverse comp. strength, $F_{2c}$ (MPa) | 15 | 228 | 128 | 158 |
| In plane shear strength, $F_6$ (MPa) | 23 | 76 | 89 | 49 |
| Density (gm/cm$^3$) | 1.4 | 1.6 | 1.97 | 1.38 |

TABLE 3

Material properties of the crush foam used in analysis (Experimentally measured)

| Type | Density | Modulus | Crush stress | Poisson's ratio |
|---|---|---|---|---|
| Polyurethane | 3 lb/ft$^3$ | 4.77 MPa | 0.294 MPa | 0.076 |

Figure 7:
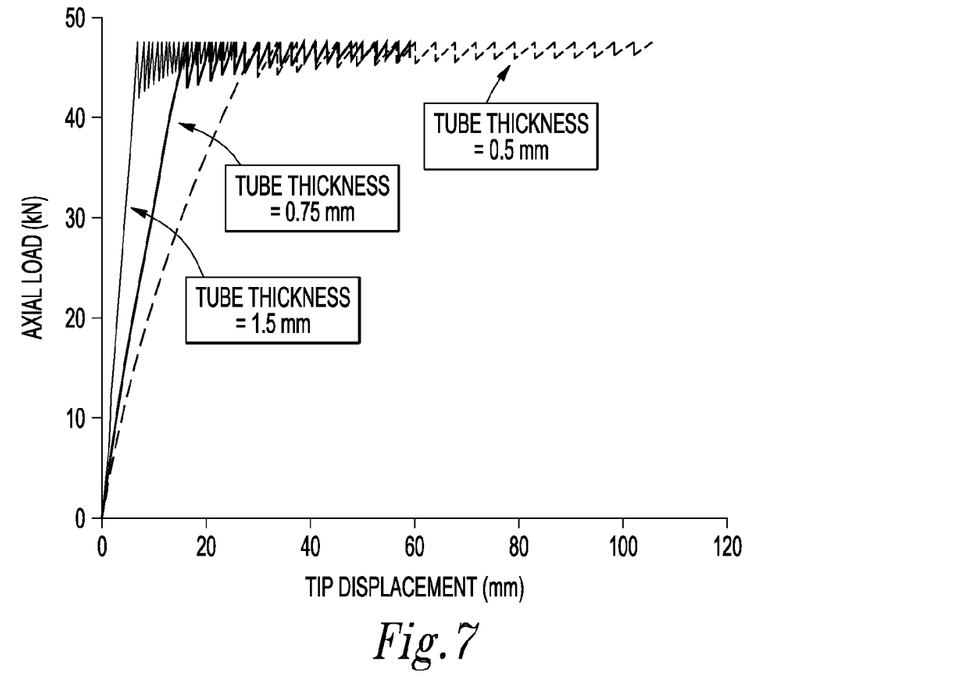
FIG. 7 is a graph similar to FIG. 6 showing force vs. displacement curves for the stitch ripping of three different thicknesses of the inner tube in our device

Variation of above mentioned parameters results in a wide range of calculated energy absorption for the device along with a wide range of strokes. FIG. 7 shows the variation in force-displacement curve with respect to change in tube thickness with constant radius throughout the stroke (linear analysis). In the test, there were 30 stitches in the cross section of the tubes and 20 stitches along the length. The tubes had a mean radius of 1 cm and length of 10 cm. The fiber angle was 30°. A single thread having a diameter of 0.36 mm and strength of 985 MPa was used providing 20 stitches along the length of the tube. As mentioned earlier, variation in force-displacement curves with respect to change in crush foam modulus is shown in FIG. 8.

Figure 6:
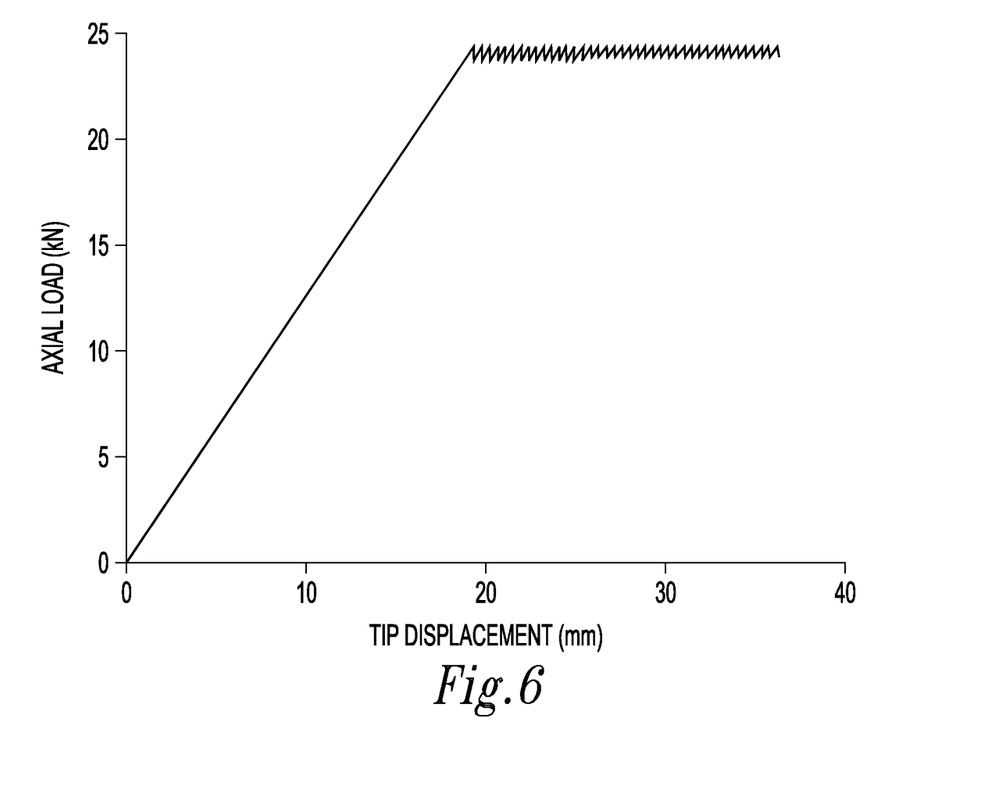
FIG. 6 is a graph of a force vs. displacement curve for the stitch ripping of one embodiment of our system.

FIG. 6 shows the force versus displacement for an embodiment in which the inner tube thickness was 1 mm and the mean radius of the tubes was 1 cm. There were 30 stitches in the cross section of the tubes and 40 stitches along the 10 cm length of the tubes. One thread was used for the stitches using a thread having a diameter of 0.36 mm and strength of 985 MPa. The fiber angle 0 was 45 degrees. A similar device was used for the tests reported in FIG. 8 except that there were 50 stitches along the length of the tube and 10 stitches in the tube cross section.

Every peak in the FIG. 6 corresponds to a stitch rupture. In the stitch ripping part of the analysis, the fiber re-orientation is not taken into account. A decreasing stiffness behavior can be seen with increasing axial load. This is caused by the reduction in cross-sectional area of the tube with applied tension, which is accounted for in the model.

Figure 13:
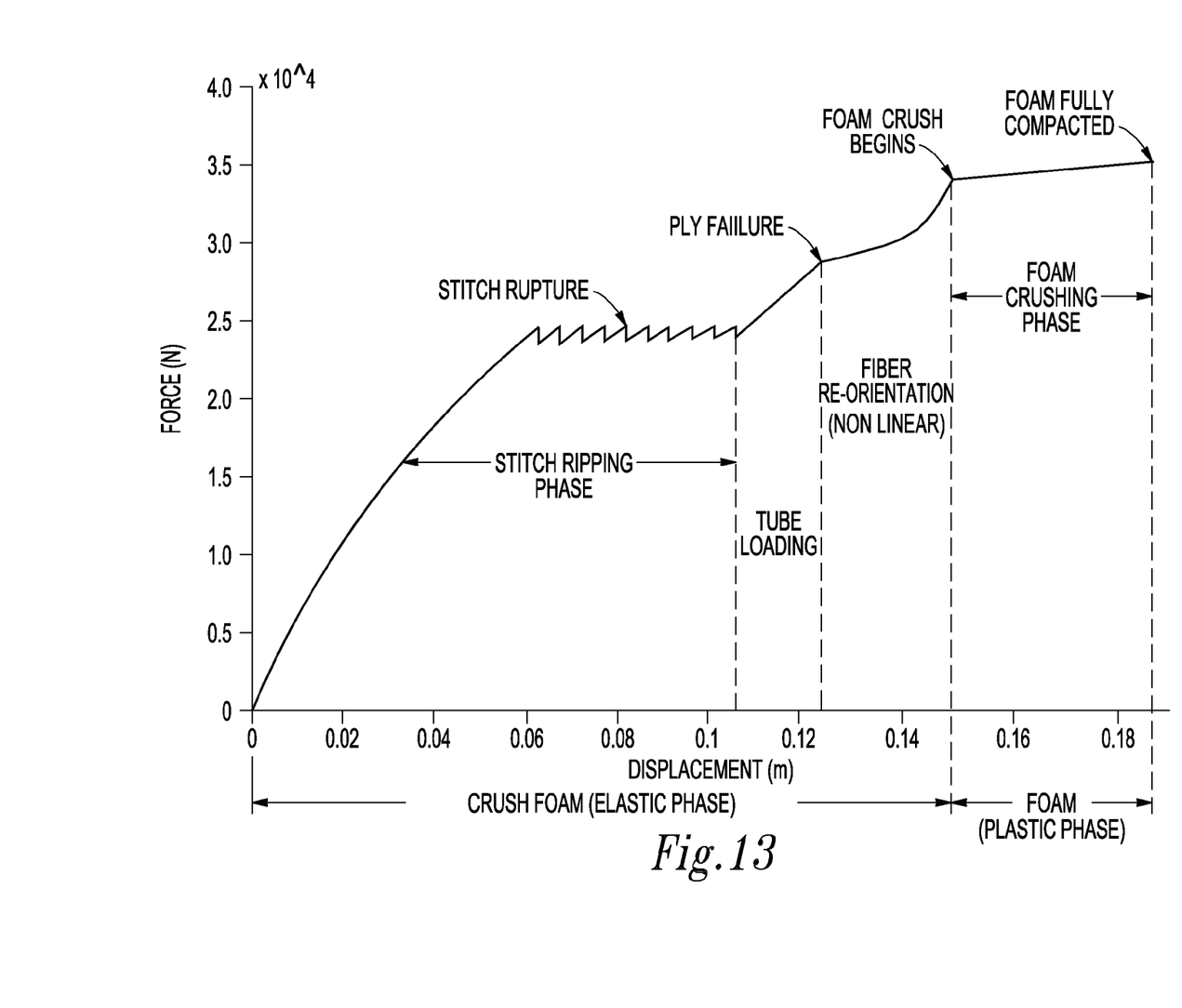
FIG. 13 is a graph showing various stages of stitch ripping and foam crushing.

During axial tensile loading, the device contracts transversely due to Poisson's effect while the interior foam filling applies a proportional internal pressure loading on the inner tube. Consequently, the cylindrical foam filling is under an external compressive loading. After the sandwich foam and the stitch ripping phases, the crushing phase of the interior foam initiates. This phase of the device is accompanied by fiber re-orientation and stiffness change in the tube walls. Although these effects are also present in two earlier energy absorbing phases, they are the most prominent in the crush phase. Finally, at certain applied axial load, the foam crushing initiates and the elastic energy stored in the crush core foam gets dissipated. This phase of the device is highly non-linear due to variable stiffness throughout the regime. The area under the force vs displacement curve gives the energy absorbed by the device in this regime. FIG. 13 shows a representative force vs displacement curve for stitch ripping and crush foam phases.

As can be seen from the predicted behavior in FIG. 13, the device passes multiple phases (linear and non-linear). The area under this curve will give the energy absorbed by the device with stitch ripping and crush foam components.

In one embodiment we use V-138 Polyester threads having the properties in Table 1. However, aramid and other types of threads can be used depending upon the design requirements. One could use one or more kinds of thread in each application. Indeed, we may use two threads of different strength, which may be the same material or different materials, to stitch the concentric tubes together. Thread diameter may be from 0.1 mm to 3.0 mm.

Although we prefer that the orientation of the fibers in the inner tube be equal and opposite in sign to the orientation of the fibers in the outer tube, such an orientation is not essential. Indeed, any orientation of the fibers in the inner tube that is different from the orientation of the fibers in the outer tube will provide energy absorption.

The amount of energy absorption will depend upon the materials used for tubes and thread as well as the relative orientation of the fibers in the tubes.

Although we disclose certain present preferred composites in Table 2, other composite material systems could be used depending upon the design requirements.

Figure 4:
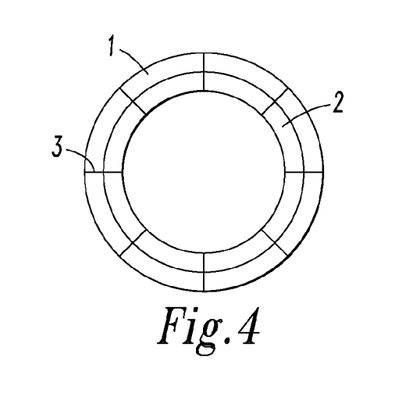
FIG. 4 is an end view of the embodiment shown in FIG. 1.
Figure 5:
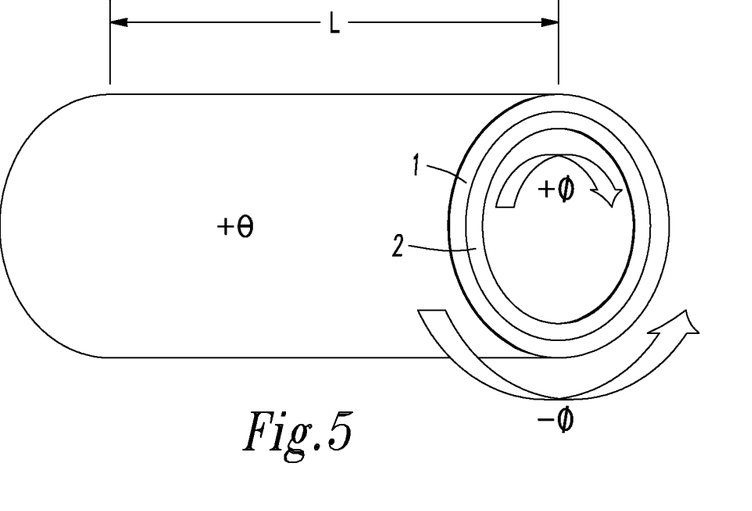
FIG. 5 is a perspective view of the embodiment of FIG. 1 in which the directions of twist of inner and outer tubes are indicated by arrows.
Figure 10:
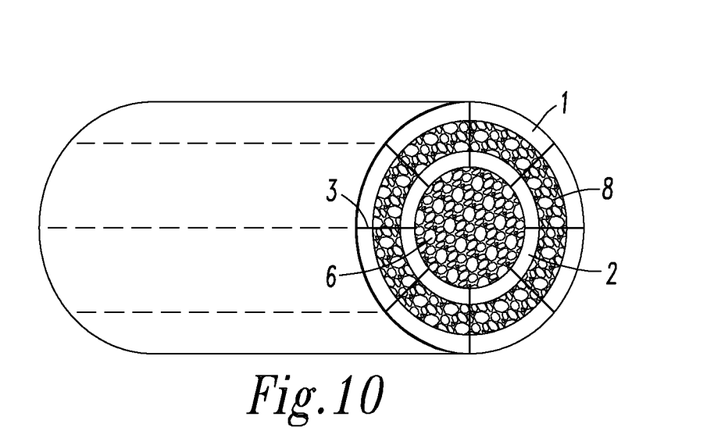
FIG. 10 is a perspective view of a third present preferred embodiment of our energy absorbing system for restraining cargo in a transport vehicle.

The central cavity of the inner tube may be open as shown in FIG. 4 or may be filled with a crushable foam core 6 as shown in FIG. 10. We further prefer that the core be plastically deformable or brittle so that the cell walls will inelastically bend or fracture when subjected to a crush force. The core should have a high modulus and low crushing strength. When a core is used, energy absorption is obtained both by stitch ripping and flexure or fracture of the cell walls in the core.

Figure 11:
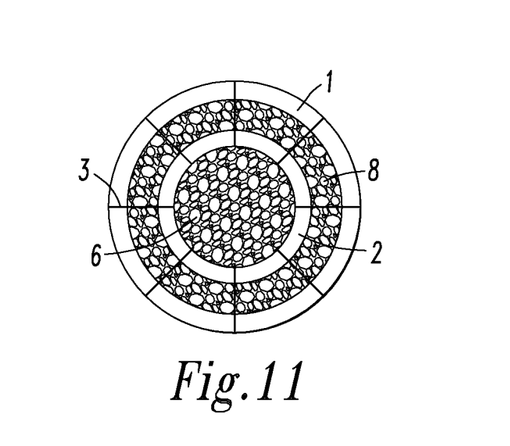
FIG. 11 is an end view of the embodiment shown in FIG. 12.
Figure 12:
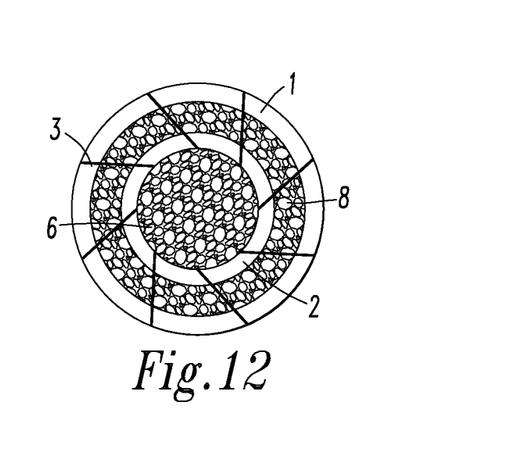
FIG. 12 is a an end view similar to FIG. 11 showing the device after a force has been applied and energy has been dissipated by thread twisting and foam fracture.

In yet another embodiment shown in FIGS. 11 and 12, the outer tube 1 is spaced apart from the inner tube 2 to form an annular cavity between the tubes. This cavity is filled with a core-like foam or honeycomb 8. We prefer that the inner tube is also filled with a crushable foam core 6 as shown in FIGS. 11 and 12. However, the inner tube 2 could be open as in the embodiment of FIG. 4. The tubes 1, 2 are stitched together by thread 3 as in the previous embodiments. In the embodiment shown in FIGS. 11 and 12 the inner core 6 and the annular core 8 between the two tubes can be the same material or a different material. We prefer that both cores are plastically deformable or brittle so that the cells will inelastically bend or fracture when subjected to a force. In this embodiment, energy is absorbed by stitch ripping, shearing of the core in the annular cavity between the tubes and crushing of the core inside the inner tube. Materials such as polyvinyl chloride, polyurethane, polycarbonate, styrene, ABS plastic, and aluminum can be used for the foam in the inner and annular core regions.

As will be clear to those of skill in the art, the present invention may be altered in various ways without departing from the scope or teaching of the present invention. As such, this disclosure should be interpreted broadly.

We claim:

1. An energy absorbing system comprising an inner tube comprised of a set of fibers oriented in a first direction and an outer tube comprised of a second set of fibers oriented in a direction different from the first direction the inner tube and the outer tube stitched together with stitches such that when an axial force is applied to the system the tubes have a tendency to twist in opposite directions and at a certain applied axial force the tubes move relative to one another and the stitches rip.

2. The energy absorbing system of claim 1 wherein the tubes are stitched together along a plurality of seams.

3. The energy absorbing system of claim 2 wherein the seams are parallel to a longitudinal axis of the outer tube.

4. The energy absorbing system of claim 2 wherein the seams are not parallel to a longitudinal axis of the outer tube.

5. The energy absorbing system of claim 1 wherein the inner tube and outer tube are stitched together by threads that are made from polyester or aramid.

6. The energy absorbing system of claim 1 wherein the inner and outer tubes are stitched together by threads of different strength.

7. The energy absorbing system of claim 1 wherein the thread has a diameter of at between 0.1 mm to 3 mm.

8. The energy absorbing system of claim 1 wherein at least one of the inner tube and outer tube is comprised of a composite material.

9. The energy absorbing system of claim 6 wherein the composite material is a flexible matrix composite, a carbon epoxy composite, an aramid epoxy composite or an E-glass epoxy composite.

10. The energy absorbing system of claim 1 wherein the orientation of the fibers in the first tube is equal and opposite in sign to the orientation of the fibers in the second tube.

11. The energy absorbing system of claim 1 also comprising a cellular core within the inner tube.

12. The energy absorbing system of claim 11 wherein the core is a closed cell foam.

13. The energy absorbing system of claim 11 wherein the cellular core is comprised of polyvinyl chloride, polyurethane, polycarbonate, styrene, ABS plastic or aluminum.

14. The energy absorbing system of claim 1 wherein the outer tube and the inner tube are spaced apart from one another to form an annular cavity between the outer tube and the inner tube and further comprising a cellular material within the cavity.

15. The energy absorbing system of claim 14 wherein the cellular material is a closed cell foam.

16. The energy absorbing system of claim 14 wherein the cellular material is comprised of polyvinyl chloride, polyurethane, polycarbonate, styrene, ABS plastic or aluminum.

* * * * *

UNITED STATES PATENT AND TRADEMARK OFFICE
CERTIFICATE OF CORRECTION

PATENT NO.         : 8,828,513 B2                           Page 1 of 1
APPLICATION NO.    : 12/538978
DATED              : September 9, 2014
INVENTOR(S)        : Chandrashekhar Tiwari et al.

It is certified that error appears in the above-identified patent and that said Letters Patent is hereby corrected as shown below:

In the Specification,

At Column 1, Lines 12-17, replace the following paragraph under the heading Government Sponsorship "The U.S. Government has a paid-up license in this invention and the right in limited circumstances to require the patent owner to license others on reasonable terms as provided for by the terms of Contract Nos. N00014-06-1-0205 and N00014-08-C-0420 awarded by the Office of Naval Research."

with

-- This invention was made with government support under Contract Nos. N00014-06-1-0205 and N00014-08-C-0420, awarded by the Office of Naval Research. The Government has certain rights in the invention. --

Signed and Sealed this
Fourteenth Day of April, 2015

Michelle K. Lee
*Director of the United States Patent and Trademark Office*